United States Patent
Zhong et al.

(10) Patent No.: US 12,406,493 B2
(45) Date of Patent: Sep. 2, 2025

(54) IMAGE PROCESSING DEVICE

(71) Applicant: FANUC CORPORATION, Yamanashi (JP)

(72) Inventors: Tingting Zhong, Yamanashi (JP); Shouta Takizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 273 days.

(21) Appl. No.: 18/035,827

(22) PCT Filed: Dec. 28, 2021

(86) PCT No.: PCT/JP2021/048801
§ 371 (c)(1),
(2) Date: May 8, 2023

(87) PCT Pub. No.: WO2022/149544
PCT Pub. Date: Jul. 14, 2022

(65) Prior Publication Data
US 2023/0401842 A1    Dec. 14, 2023

(30) Foreign Application Priority Data
Jan. 6, 2021  (JP) ................. 2021-000857

(51) Int. Cl.
*G06V 10/98* (2022.01)
*G06V 10/776* (2022.01)
*H04N 23/60* (2023.01)

(52) U.S. Cl.
CPC .......... *G06V 10/993* (2022.01); *G06V 10/776* (2022.01); *H04N 23/64* (2023.01)

(58) Field of Classification Search
CPC .... G06V 10/993; G06V 10/776; H04N 23/64; H04N 23/72; H04N 23/60; H04N 23/71;
(Continued)

(56) References Cited

U.S. PATENT DOCUMENTS 8,115,857 B2 *  2/2012  Kuniba ............... G06T 5/70
                                                   348/222.1
10,129,456 B1 * 11/2018  Kim ..................... G06T 7/13
(Continued)

FOREIGN PATENT DOCUMENTS

JP   2018-005505   1/2018
JP   2019-204185   11/2019
(Continued)

OTHER PUBLICATIONS

International Search Report issued Mar. 22, 2022, in International (PCT) Application No. PCT/JP2021/048801, with English translation.

*Primary Examiner* — Michael S Osinski
(74) *Attorney, Agent, or Firm* — Wenderoth, Lind & Ponack, L.L.P.

(57) ABSTRACT

The parameters of image processing are adjusted for detecting a workpiece, by quantifying the quality of the parameters of the image processing. This image processing device automatically adjusts detection parameters that are used in image processing for detecting an imaging object. The image processing device includes a detection parameter generation unit that generates detection parameter combinations, an imaging condition setting unit that sets imaging conditions for each of the detection parameter combinations, a detectability determination unit that determines whether or not the imaging object is detectable for each combination of detection parameters and imaging conditions, an imaging range calculation unit that calculates a range of imaging conditions under which the imaging object is determined, by the detectability determination unit, to have been detected, and a parameter determination unit that determines a detection parameter combination for which the calculated range of imaging conditions is the widest.

6 Claims, 6 Drawing Sheets

(58) Field of Classification Search
CPC .... H04N 23/73; H04N 23/741; H04N 23/698; H04N 23/743; H04N 23/76; H04N 23/88; H04N 23/90; G06T 2207/20081; G06T 2207/20084; G06T 2207/30164; G06T 5/50; G06T 7/0004; G06T 1/0007; G06T 11/60

See application file for complete search history.

(56) References Cited

U.S. PATENT DOCUMENTS

| | | | |
|---|---|---|---|
| 11,245,857 B2* | 2/2022 | Sasaki | H04N 23/73 |
| 11,284,014 B2* | 3/2022 | Kawaguchi | H04N 23/90 |
| 12,192,627 B2* | 1/2025 | Kobayashi | H04N 23/683 |
| 2002/0018129 A1* | 2/2002 | Ikeda | H04N 23/88 |
| | | | 348/223.1 |
| 2004/0207736 A1* | 10/2004 | Muramatsu | H04N 23/82 |
| | | | 348/254 |
| 2011/0058098 A1* | 3/2011 | Ivashin | H04N 23/64 |
| | | | 348/744 |
| 2011/0149095 A1* | 6/2011 | Kikuchi | H04N 23/743 |
| | | | 348/E5.037 |
| 2013/0076973 A1* | 3/2013 | Kobayashi | H04N 23/743 |
| | | | 348/362 |
| 2015/0070528 A1* | 3/2015 | Kikuchi | H04N 23/95 |
| | | | 348/224.1 |
| 2015/0373246 A1* | 12/2015 | Arakawa | H04N 23/73 |
| | | | 348/234 |
| 2016/0105596 A1* | 4/2016 | Hatakeyama | H04N 23/951 |
| | | | 348/239 |
| 2017/0206441 A1* | 7/2017 | Miyano | H04N 7/18 |
| 2017/0223250 A1* | 8/2017 | Ajito | H04N 25/134 |
| 2018/0097988 A1* | 4/2018 | Tsuchiya | H04N 25/533 |
| 2018/0330193 A1* | 11/2018 | Ikeda | G06T 7/0004 |
| 2019/0005356 A1* | 1/2019 | Tsunoda | G06V 10/776 |
| 2019/0199901 A1* | 6/2019 | Kondo | G06T 5/90 |
| 2019/0199902 A1* | 6/2019 | Cooper | H04N 23/743 |
| 2019/0364193 A1* | 11/2019 | Hyuga | H04N 23/62 |
| 2020/0137281 A1* | 4/2020 | Omori | H04N 23/611 |
| 2020/0228698 A1* | 7/2020 | Yahata | H04N 9/646 |
| 2020/0273194 A1* | 8/2020 | Yoshida | H04N 13/296 |
| 2020/0404235 A1* | 12/2020 | Moriya | H04N 23/95 |
| 2021/0144354 A1* | 5/2021 | Li | H04N 23/60 |
| 2022/0198608 A1* | 6/2022 | Amemiya | G06N 3/045 |
| 2023/0128043 A1* | 4/2023 | Goto | H04N 23/61 |
| | | | 348/345 |

FOREIGN PATENT DOCUMENTS

| | | |
|---|---|---|
| JP | 2020-181374 | 11/2020 |
| TW | 200722740 | 6/2007 |
| WO | 2020/065798 | 4/2020 |

* cited by examiner

| BOX DETECTION PARAMETERS \ EXPOSURE TIME (ms) | 10 | 20 | 30 | 40 | ... | 400 |
|---|---|---|---|---|---|---|
| PARAMETER SET A | × | ○ | × | × | × | × |
| PARAMETER SET B | × | ○ | ○ | × | × | × |
| PARAMETER SET C | ○ | ○ | ○ | ○ | × | × |
| PARAMETER SET D | ○ | ○ | ○ | ○ | ○ | ○ |

○: BOX DETECTED CORRECTLY
×: DETECTION FAILED

OPTIMAL PARAMETER SET

FIG. 4

| BOX DETECTION PARAMETERS \ AMOUNT OF LED LIGHT | 1 | 2 | 3 | 4 | ... | 16 |
|---|---|---|---|---|---|---|
| PARAMETER SET A | × | ○ | ○ | × | × | × |
| PARAMETER SET B | × | ○ | ○ | ○ | × | × |
| PARAMETER SET C | ○ | ○ | ○ | ○ | × | × |
| PARAMETER SET D | ○ | ○ | ○ | ○ | ○ | ○ |

OPTIMAL PARAMETER SET

○: BOX DETECTED CORRECTLY
×: DETECTION FAILED

FIG. 5

| BOX DETECTION PARAMETERS \ IMAGE REDUCTION | 1 | 1/2 | 1/3 | 1/4 | ... | 1/8 |
|---|---|---|---|---|---|---|
| PARAMETER SET A | ○ | ○ | × | × | × | × |
| PARAMETER SET B | ○ | ○ | ○ | × | × | × |
| PARAMETER SET C | ○ | ○ | ○ | ○ | × | × |
| PARAMETER SET D | ○ | ○ | ○ | ○ | ○ | ○ |

OPTIMAL PARAMETER SET

○: BOX DETECTED CORRECTLY
×: DETECTION FAILED

IMAGE PROCESSING DEVICE

TECHNICAL FIELD

The present invention relates to an image processing device.

BACKGROUND ART

Conventionally, when imaging objects are detected by using a visual sensor such as a camera in a production line provided with a robot, it is common practice to create an environment for capturing images so as to easy to find imaging objects by setting up lighting as appropriate.

However, ideal lighting conditions may not always be achieved due to the performance of the lighting used, ceiling lighting, or the like.

For example, the entire brightness of an imaging range cannot be made uniform, and the brightness at an edge of the imaging range may become darker than the brightness at the center of the imaging range.

When lighting unevenness exists between the center and the edge of the imaging range, a phenomenon occurs in which a workpiece is found at the edge of the imaging range but not at the center of the imaging range, or conversely, a workpiece is found at the center of the imaging range but not at the edge of the imaging range.

In a conventional method, imaging objects are placed at an edge and the center of an imaging range, and a teaching person of an image processing device manually adjusts parameters so as to detect both the imaging objects at the edge and the center while visually checking image processing results.

In this regard, a technique is known in which a plurality of sets of parameters composed of combinations of photographing parameters (imaging conditions) for photographing an imaging object and acquiring an image and image processing parameters for detecting the imaging object from the image are manually input. In this technique, a list of a plurality of reduced images indicating results of execution of a processing sequence including photographing and image processing for the plurality of sets of parameter settings is displayed as a plurality of result images on a display unit (for example, see Patent Document 1).

Patent Document 1: Japanese Unexamined Patent Application, Publication No. 2019-204185

DISCLOSURE OF THE INVENTION

Problems to be Solved by the Invention

However, since it is not possible to quantify whether image processing parameters for detecting imaging objects from an image are good or poor, individual differences occur in the adjustment of image processing parameters depending on the skill level of the teaching person.

Means for Solving the Problems

An aspect of the present disclosure is an image processing device configured to automatically adjust detection parameters used in image processing for detecting an imaging object. The image processing device includes a detection parameter generation unit configured to generate a plurality of combinations of the detection parameters, an imaging condition setting unit configured to set a plurality of imaging conditions for each of the combinations of the detection parameters generated by the detection parameter generation unit, a detectability judgment unit configured to judge detectability of the imaging object for each combination of the detection parameters and the imaging conditions, an imaging range calculation unit configured to calculate a range of an imaging condition in which the detectability judgment unit judges that the imaging object is detected, and a parameter determination unit configured to determine a combination of the detection parameters based on the range of the imaging condition calculated by the imaging range calculation unit.

Effects of the Invention

According to the aspect, it is possible to adjust the detection parameters regardless of the skill level of the teaching person by quantifying whether the detection parameters are good or poor.

BRIEF DESCRIPTION OF THE DRAWINGS

FIG. 4 is a table showing a method of determining optimal parameters of the image processing device according to the embodiment;

FIG. 5 is a table showing a method of determining optimal parameters of the image processing device according to the embodiment.

PREFERRED MODE FOR CARRYING OUT THE INVENTION

Hereinafter, an embodiment of the present invention will be described with reference to FIGS. 1 to 6.

1 CONFIGURATION OF EMBODIMENT

Figure 1:
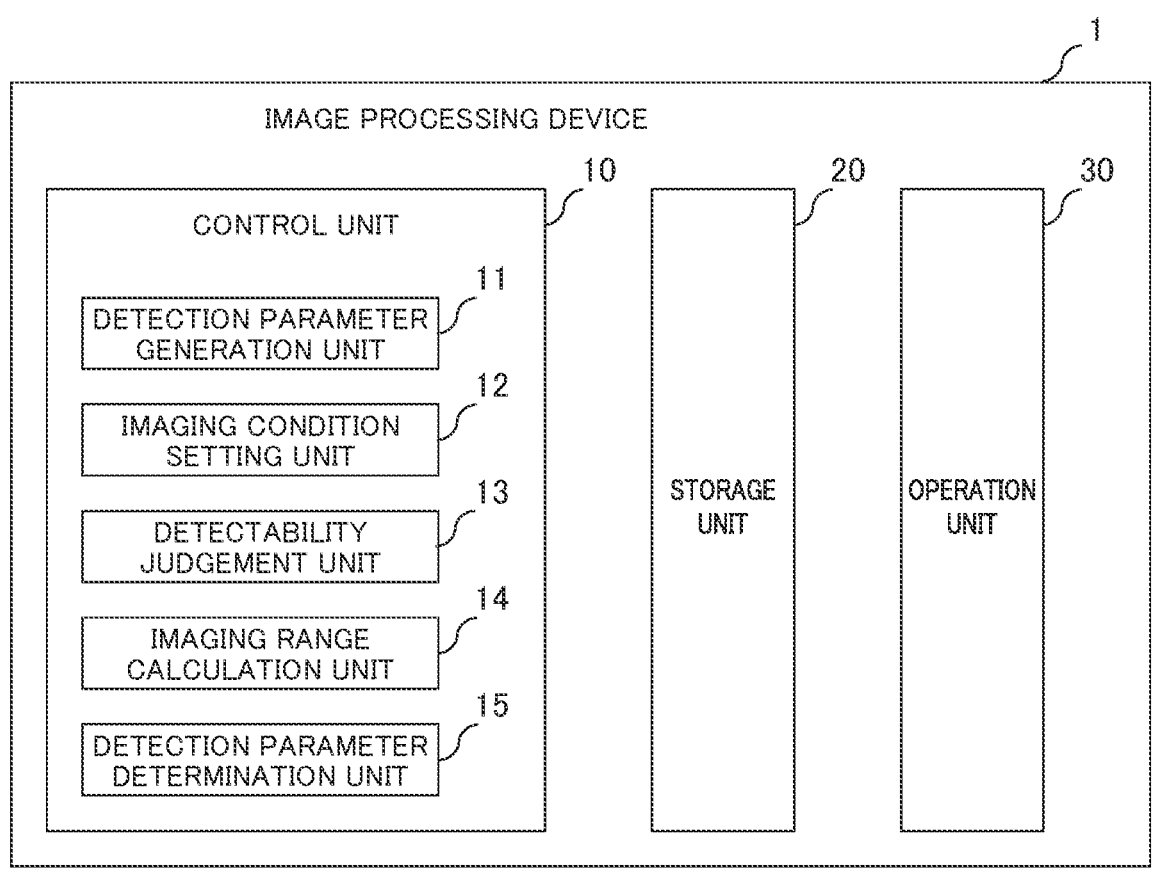
FIG. 1 is a functional block diagram of an image processing device according to an embodiment.

FIG. 1 is a functional block diagram of an image processing device 1 according to the present embodiment. The image processing device 1 includes a control unit 10, a storage unit 20, and an operation unit 30.

The control unit 10 includes a CPU, ROM, RAM, CMOS memory, and the like, which are configured to communicate with each other via a bus, and are well known to those skilled in the art.

The CPU is a processor that controls the image processing device 1 overall.

The CPU reads a system program and an application program stored in the ROM via the bus and controls the overall image processing device 1 according to the system program and the application program. Thus, as shown in FIG. 1, the control unit 10 is configured to realize functions of a detection parameter generation unit 11, an imaging condition setting unit 12, a detectability judgment unit 13, an imaging range calculation unit 14, and a detection parameter determination unit 15.

The detection parameter generation unit 11 generates a plurality of combinations of detection parameters for each of the detection parameters.

The "detection parameters" vary depending on the image processing algorithm, and include, for example, a score threshold, a contrast threshold, and a distortion tolerance.

The "score threshold" is a threshold for judging whether the detection result is detection OK or detection NG.

Specifically, the correctness of the results of detecting an object is expressed as a score (units of %) out of 100.

If this score is equal to or greater than the "score threshold", it is detection OK, and if this score is less than the "score threshold", it is detection NG.

The "contrast threshold" is a threshold indicating how much contrast (brightness difference) is necessary in a captured image to recognize as a feature.

When a small value is set as the contrast threshold, it is possible to detect an image that is not clearly visible, but it takes a long time to perform image processing.

In the case of erroneous detection of low-contrast matters such as mere stains in an object, the contrast threshold is increased.

The "distortion tolerance" is a threshold (units of pix) that allows for a deviation (distortion) in shape between a taught model and a pattern applied to an object shown in an image.

When a large value is designated as the distortion tolerance, detection can be performed even if the deviation in shape is large, but the possibility of erroneous detection becomes high.

The imaging condition setting unit 12 sets a plurality of imaging conditions for each of the detection parameter sets generated by the detection parameter generation unit 11.

The "imaging conditions" vary depending on the imaging device, and include, for example, an exposure time of a camera as the imaging device, an amount of light of lighting used for imaging, and a reduction ratio of a captured image.

The imaging condition setting unit 12 prepares, as combinations of detection parameters (detection parameter sets), for example, a plurality of combinations (sets) of a score threshold, a contrast threshold, and a distortion tolerance, and sets, for each detection parameter set, a plurality of combinations of imaging conditions such as an exposure time of the camera, an amount of light of lighting used for imaging, and a reduction ratio of a captured image.

The plurality of detection parameter sets prepared may be all combinations of values that can be set for the respective parameters.

At this time, for example, the value of each of the parameters may be determined by equally dividing the range that can be set as each of the parameters.

Alternatively, the plurality of detection parameter sets may be all combinations of values that can be set within a predetermined range centered on values manually adjusted to some extent by the user of the image processing device 1.

The detectability judgment unit 13 judges detectability of the imaging object for each combination of a detection parameter set and imaging conditions.

Specifically, first, the detectability judgment unit 13 judges detectability of the imaging object when imaged under the first imaging condition using the first detection parameter set.

Next, the detectability judgment unit 13 judges detectability of the imaging object when imaged under the second imaging condition using the first detection parameter set.

In the same manner, the detectability judgment unit 13 judges detectability of the imaging object when imaged under all imaging conditions using the first detection parameter set.

After judging detectability of the imaging object when imaged under all imaging conditions using the first detection parameter set, the detectability judgment unit 13 judges detectability of the imaging object when imaged under all imaging conditions using the second detection parameter set.

In the same manner, for all detection parameter sets, the detectability judgment unit 13 judges detectability of the imaging object when imaged under all imaging conditions.

Here, the detectability judgment unit 13 may judge detectability based on whether the detection result of the imaging object satisfies a predetermined correct condition.

Alternatively, the detectability judgment unit 13 may judge detectability based on whether a detection position at which a known imaging object is actually detected matches a known placement position of said imaging object.

In the case of judging detectability based on whether the correct condition is satisfied, a step of determining the correct condition may be performed before a step of judging detectability (Step S5 in the operation of the embodiment described later).

Examples of the correct condition include "detection accuracy", "detection position", "number of detections", and "detection time".

The "detection accuracy" is a variation in the detection position when the same imaging object is repeatedly detected without changing the parameters.

When the reduction ratio of the image is increased, the "detection time" is shortened, but the detection accuracy is lowered.

According to the correct condition based on the "detection position", by specifying in advance the position and the range in which the imaging object is to be detected, it can be judged that the detection is erroneous detection in the case of the imaging object being detected at an unexpected position.

If the score threshold is too low or the distortion tolerance is too large, erroneous detection is likely to Occur.

According to the correct condition based on the "number of detections", when the actual number of detections differs from a preset number of detections, it can be judged that the detection has failed.

When the "number of detections" is 0, it can be judged that the detection has failed because the parameters are too strict.

Conversely, when the "number of detections" is larger than an expected number, it can be judged that the detection has failed because the parameters are too loose.

The "detection time" is a time required for detection.

Even if the detection is successful, if the "detection time" is too long, since the cycle time is not satisfied, the parameters are unacceptable.

When the reduction ratio of the image is reduced or the score threshold is small, the "detection time" becomes long.

The imaging range calculation unit 14 calculates the range of an imaging condition in which the detectability judgement unit 13 judges that the imaging object is detected.

Specifically, after the detectability judgment unit 13 judges detectability of the imaging object in all cases of an imaging condition using the first detection parameter set, the imaging range calculation unit 14 calculates the range of the imaging condition in which the detection of the imaging object is successful.

Next, after the detectability judgment unit 13 judges detectability of the imaging object in all cases of the imaging condition using the second detection parameter set, the imaging range calculation unit 14 calculates the range of the imaging condition in which the detection of the imaging object is successful.

In the same manner, for all detection parameter sets, the imaging range calculation unit 14 calculates the ranges of the imaging condition in which the detection of the imaging object is successful.

The detection parameter determination unit 15 determines an image processing parameter set based on the ranges of the imaging condition calculated by the imaging range calculation unit 14.

For example, the detection parameter determination unit 15 may determine a detection parameter set having the widest range of the imaging condition calculated by the imaging range calculation unit 14 as an image processing parameter set to be actually used.

The storage unit 20, for example, stores imaging conditions set by the imaging condition setting unit 12, detection results by the detectability judgment unit 13, imaging ranges calculated by the imaging range calculation unit 14, and a detection parameter set determined by the detection parameter determination unit 15.

The operation unit 30 executes setting of detection parameters and imaging conditions, and adjustment of detection parameters.

The operation unit 30 may be realized by a monitor that displays the operation screen described later with reference to FIG. 6.

In this case, a touch panel for accepting an operation from the user of the image processing device 1 is laminated on the monitor.

Figure 6:
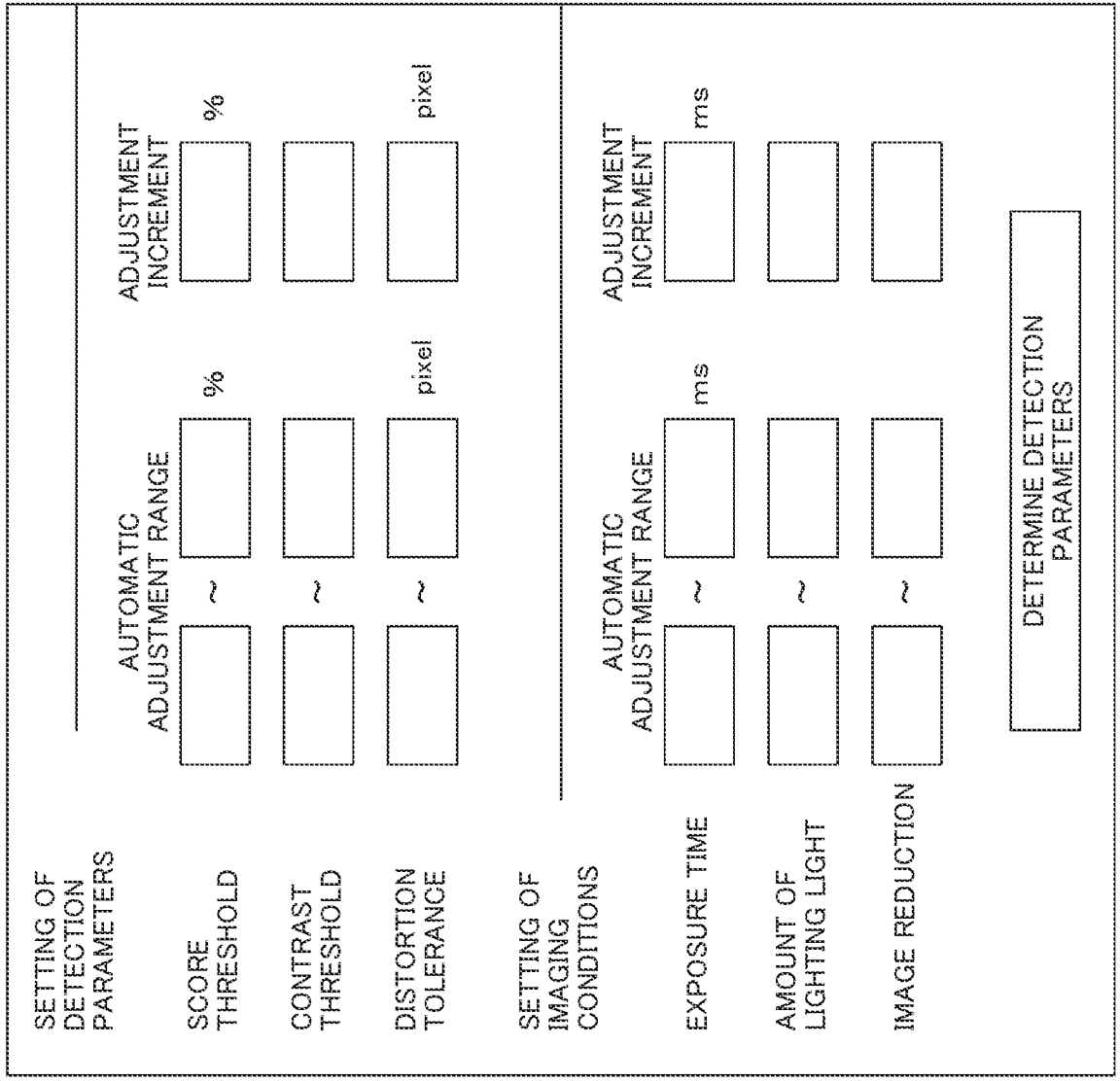
FIG. 6 is an example of an operation screen of the image processing device according to the embodiment.

Alternatively, the operation unit 30 may be realized by an input device such as a keyboard or a mouse for inputting to the operation screen in FIG. 6.

As another embodiment, the image may be divided into one or more regions, and the detection parameter set may be determined for each region.

2 OPERATION OF THE EMBODIMENT

Figure 2:
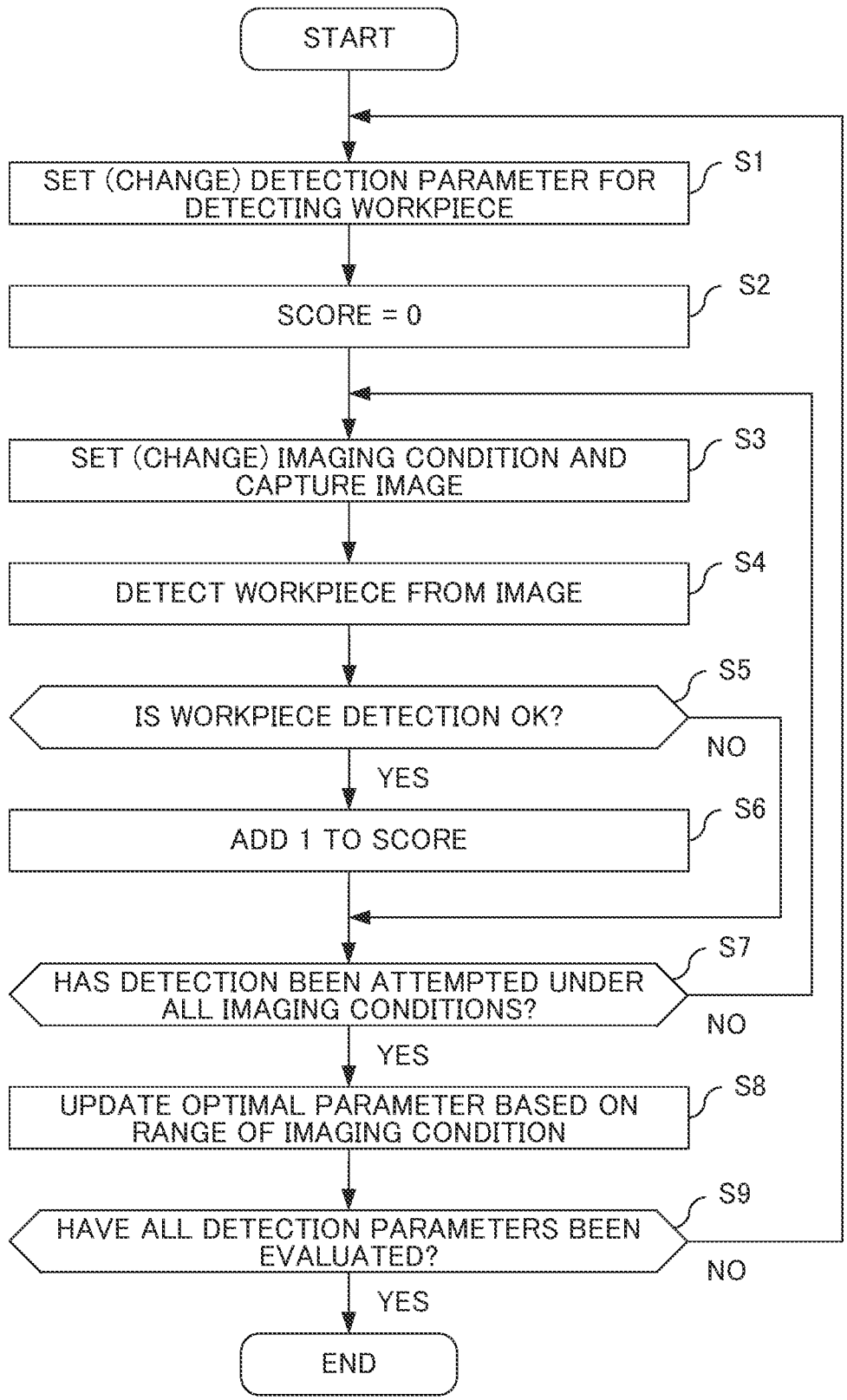
FIG. 2 is a flowchart showing the operation of the image processing device according to the embodiment.

FIG. 2 is a flowchart showing the operation of the image processing device 1 according to the present embodiment.

The operation of the image processing device 1 will be described with reference to FIG. 2.

In Step S1, the detection parameter generation unit 11 sets a parameter set (detection parameter set) for detecting an imaging object.

More specifically, as the detection parameter set, for example, a score threshold, a contrast threshold, and a distortion tolerance are combined and initially set.

In Step S2, the control unit 10 sets the value of the score threshold to 0 among the initially set score threshold, contrast threshold, and distortion tolerance.

In the example shown in FIG. 2, as will be described later, the score threshold is incremented by 1 from 0 to 100 to attempt to detect the imaging object while the contrast threshold and the distortion tolerance are fixed at the initial setting values; however, the present embodiment is not limited thereto.

For example, the imaging object detection may be attempted by changing the contrast threshold while fixing the score threshold and the distortion tolerance at the initial setting values. The imaging object detection may be attempted by changing the distortion tolerance while fixing the score threshold and the contrast threshold at the initial setting values.

In Step S3, the imaging condition setting unit 12 sets an imaging condition, and an imaging device captures an image of the imaging object.

More specifically, for example, after the imaging condition setting unit 12 sets an exposure time as an imaging condition, a visual sensor captures an image of the imaging object.

In Step S4, the control unit 10 detects the imaging object from the image captured in Step S3 using the detection parameters.

In Step S5, when the detectability judgment unit 13 judges that the detection of the imaging object is OK (S5: YES), the processing advances to Step S6.

When the detectability judgment unit 13 judges that the detection of the imaging object is NG (S5: NO), the processing advances to Step S7.

Before Step S5 of judging detectability, the step of determining the correct condition may be performed.

In Step S6, the control unit 10 adds 1 to the score threshold.

In Step S7, when detection has been attempted under all imaging conditions (S7: YES), the processing advances to Step S8.

When detection has not yet been attempted under all imaging conditions (S7: No), the processing advances to Step S3, and the imaging condition is changed to capture an image.

In Step S8, the imaging range calculation unit 14 calculates the range of the imaging condition in which the imaging object is judged to be detected, and the detection parameter determination unit 15 selects and updates an optimal detection parameter set based on the calculated range of the imaging condition.

Figure 3:
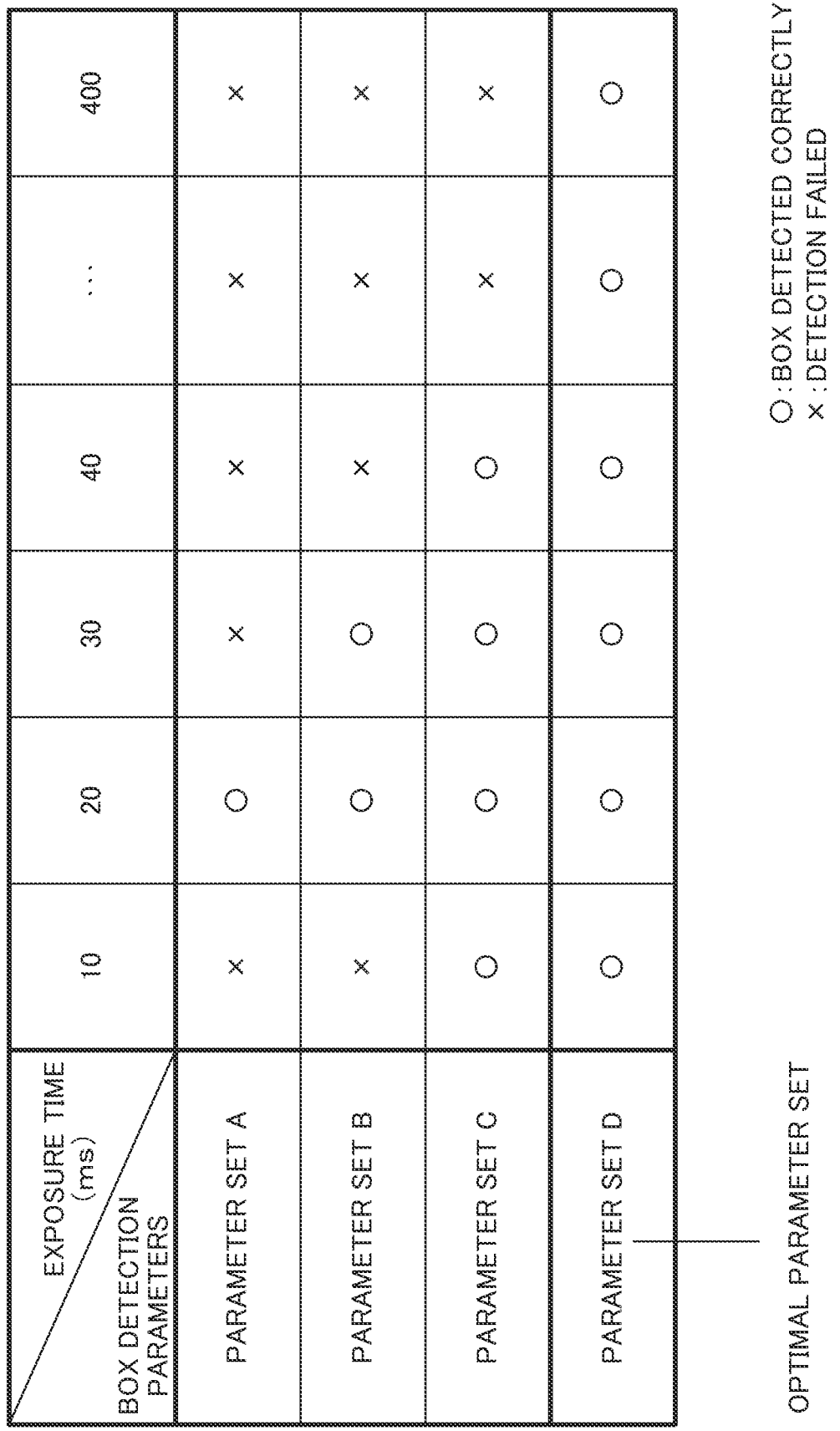
FIG. 3 is a table showing a method of determining optimal parameters of the image processing device according to the embodiment.

FIGS. 3 to 5 show examples of selection of an optimal detection parameter set.

FIG. 3 is a table showing the ranges of an imaging condition of respective detection parameter sets when the amount of lighting light and the image reduction value are fixed and the exposure time is changed from 10 ms to 400 ms. The range of the imaging condition (The range of the exposure time) for parameter set A is 20 ms.

The range of the imaging condition (The range of the exposure time) for parameter set B is 20 ms to 30 ms.

The range of the imaging condition (The range of the exposure time) for parameter set C is 10 ms to 40 ms.

The range of the imaging condition (The range of the exposure time) for parameter set D is 10 ms to 400 ms.

Since parameter set D has the widest range of the imaging condition (the exposure time) among parameter sets A to D, the detection parameter determination unit 15 determines parameter set D as the optimal detection parameter set.

FIG. 4 is a table showing the ranges of an imaging condition of respective detection parameter sets when the exposure time and the image reduction value are fixed and the amount of lighting light is changed from 1 to 16.

The range of the amount of lighting light for parameter set A is 2 to 3.

The range of the amount of lighting light for parameter set B is 2 to 4.

The range of the amount of lighting light for parameter set C is 1 to 4.

The range of the amount of lighting light for parameter set D is 1 to 16.

Since parameter set D has the widest range of the imaging condition among parameter sets A to D, the detection parameter determination unit 15 determines parameter set D as the optimal detection parameter set.

FIG. 5 is a table showing the ranges of an imaging condition of respective detection parameter sets when the exposure time and the amount of lighting light are fixed and the image reduction ratio is changed from 1 to ⅛.

The range of the reduction ratio for parameter set A is 1 to ½.

The range of the reduction ratio for parameter set B is 1 to ⅓.

The range of the reduction ratio for parameter set C is 1 to ¼.

The range of the reduction ratio for parameter set D is 1 to ⅛.

Since parameter set D has the widest range of the imaging condition among parameter sets A to D, the detection parameter determination unit 15 determines parameter set D as the optimal detection parameter set.

Note that, in FIGS. 3 to 5, the optimal detection parameter set is determined by changing one imaging condition, but the present invention is not limited thereto. The optimal detection parameter set may be determined by changing a plurality of imaging conditions.

In Step S9, when all detection parameter sets have been evaluated (S9: YES), all processing ends.

When all detection parameter sets have not yet been evaluated (S9: NO), the processing returns to Step S1, and changes the detection parameter set for detecting the imaging object.

3 EXAMPLES

FIG. 6 shows an example of the operation screen of the image processing device 1.

The operation screen shown in FIG. 6 includes the setting items of the detection parameters, the setting items of the imaging conditions, and a detection parameter determination button.

For each of the detection parameters, a range of values and an adjustment increment can be set.

An operation screen for adding or deleting a detection parameter to be adjusted may be further provided.

For each of the imaging conditions, a range of values and an adjustment increment can be set.

An operation screen for adding or deleting an imaging condition may be further provided.

When automatic adjustment ranges and adjustment increments of the detection parameters and the imaging conditions are set, and then the detection parameter determination button is pressed, the detection parameters are adjusted.

Instead of pressing the button on the operation screen, an API for adjusting detection parameters may be called from a program to perform adjustment.

4 EFFECTS OF THE EMBODIMENT

The image processing device (e.g., the "image processing device 1" described above) of the present embodiment is configured to automatically adjust detection parameters used in image processing for detecting an imaging object. The image processing device includes a detection parameter generation unit (e.g., the "detection parameter generation unit 11" described above) configured to generate a plurality of combinations of the detection parameters, an imaging condition setting unit (e.g., the "imaging condition setting unit 12" described above) configured to set a plurality of imaging conditions for each of the combinations of the detection parameters generated by the detection parameter generation unit, a detectability judgment unit (e.g., the "detectability judgment unit 13" described above) configured to judge detectability of the imaging object for each combination of the detection parameter set and the imaging conditions, an imaging range calculation unit (e.g., the "imaging range calculation unit 14" described above) configured to calculate a range of an imaging condition in which the detectability judgment unit judges that the imaging object is detected, and a parameter determination unit (e.g., the "detection parameter determination unit 15" described above) configured to determine a detection parameter set based on the range of the imaging condition calculated by the imaging range calculation unit.

It is possible to automatically adjust the detection parameters by quantifying whether the detection parameters are good or poor.

In particular, by quantifying the evaluation index, individual differences between teaching persons are eliminated, and stable adjustment can be performed. Further, by automatically adjusting the detection parameters, it is possible to efficiently perform re-adjustment even when an imaging environment such as indoor lighting changes.

The parameter determination unit may be configured to determine a combination of the detection parameters having a widest range of the imaging condition as the combination of the detection parameters.

This makes it possible to handle a wider range of an imaging condition.

The detectability judgment unit may be configured to judge detectability based on whether a detection result of the imaging object satisfies a predetermined correct condition.

This makes it possible to meet the need to artificially set the correct condition in advance.

The detectability judgment unit may be configured to judge detectability based on whether a detection position at which a known imaging object is actually detected matches a known placement position of the known imaging object.

This makes it possible to judge detectability as long as the known placement position of the imaging object is known.

The image processing device may further include an operation unit configured to execute setting of the detection parameters and the imaging conditions, and adjustment of the detection parameters.

Thus, the user of the image processing device can manually adjust the detection parameters.

Although embodiments of the present invention have been described above, the present invention is not limited to the embodiments described above.

Furthermore, the effects described in the present embodiment are illustrated as merely the most preferred effects achieved by the present invention, and the effects according to the present invention are not limited to those described in the present embodiment.

The image processing method by the image processing device 1 is implemented by software.

When it is implemented by software, a program constituting the software is installed in a computer (image processing device 1).

Furthermore, these programs may be recorded on removable media and distributed to users, or may be distributed by being downloaded to the computer of a user via a network.

Furthermore, these programs may be provided to a user's computer (image processing device 1) as a web service via a network without being downloaded.

EXPLANATION OF REFERENCE NUMERALS

1 image processing device
10 control unit 11 detection parameter generation unit
12 imaging condition setting unit
13 detectability judgment unit
14 imaging range calculation unit
15 detection parameter determination unit (parameter determination unit)
20 storage unit
30 operation unit

The invention claimed is:

1. An image processing device configured to automatically adjust detection parameters used in image processing for detecting an imaging object, the image processing device comprising:
   a detection parameter generation unit configured to generate a plurality of combinations of the detection parameters;
   an imaging condition setting unit configured to set a plurality of imaging conditions for each of the combinations of the detection parameters generated by the detection parameter generation unit;
   a detectability judgment unit configured to judge detectability of the imaging object for each combination of the detection parameters and the imaging conditions;
   an imaging range calculation unit configured to calculate a range of an imaging condition in which the detectability judgment unit judges that the imaging object is detected; and
   a parameter determination unit configured to determine a combination of the detection parameters based on the range of the imaging condition calculated by the imaging range calculation unit.

2. The image processing device according to claim 1, wherein the parameter determination unit is configured to determine a combination of the detection parameters having a widest range of the imaging condition as the combination of the detection parameters.

3. The image processing device according to claim 1, wherein the detectability judgment unit is configured to judge the detectability based on whether a detection result of the imaging object satisfies a predetermined correct condition.

4. The image processing device according to claim 1, wherein the detectability judgment unit is configured to judge the detectability based on whether a detection position at which a known imaging object is actually detected matches a known placement position of the known imaging object.

5. The image processing device according to claim 1, further comprising an operation unit configured to execute setting of the detection parameters and the imaging conditions, and adjustment of the detection parameters.

6. The image processing device according to claim 1, wherein an image is divided into one or more regions, and the combination of the detection parameters is determined for each of the regions.

* * * * *